United States Patent
Wang

[11] Patent Number: 5,322,481
[45] Date of Patent: Jun. 21, 1994

[54] EXERCISER DRIVING MECHANISM

[75] Inventor: Leao Wang, Taichung Hsien, Taiwan

[73] Assignee: Greenmaster Industrial Corp., Taiping Hsiang, Taiwan

[21] Appl. No.: 96,998

[22] Filed: Jul. 26, 1993

[51] Int. Cl.$^5$ .............................................. F16H 7/00
[52] U.S. Cl. ..................................... 474/148; 474/69; 482/64
[58] Field of Search ......................... 474/148, 101, 69; 482/57, 64

[56] References Cited

U.S. PATENT DOCUMENTS

| | | | |
|---|---|---|---|
| 3,501,142 | 3/1970 | Johansson | 482/64 |
| 4,358,105 | 11/1982 | Sweeney, Jr. | 482/64 X |
| 4,705,493 | 11/1987 | Lin | 474/69 |
| 4,790,800 | 12/1988 | Toews et al. | 474/101 |
| 5,016,870 | 5/1991 | Bulloch et al. | 482/64 X |

Primary Examiner—Thuy M. Bui
Attorney, Agent, or Firm—Bacon & Thomas

[57] ABSTRACT

An exerciser driving mechanism generally comprising a driving wheel, a timing belt, a tension wheel, a free wheel, a flywheel, and a wool felt, with which the feeling of "inoperative pedaling" likely happened to the free wheel as experienced in the prior art exerciser upon instantaneously actuating the belt may be eliminated, the gear ratio of driving wheel to free wheel is increased, the contact area of the wool felt with the flywheel is reduced to enhance the speed of inertial rotation in regard to the flywheel, while maintaining the desired friction drag efficiency, thus resulting in an excellent smooth operation.

1 Claim, 2 Drawing Sheets

EXERCISER DRIVING MECHANISM

BACKGROUND OF THE INVENTION

The present invention relates to an exerciser driving mechanism, and more particular to an exerciser driving mechanism with which the feeling of "inoperative pedaling" likely happened to a free wheel upon instantaneously actuating a belt may be eliminated, the gear ratio of driving wheel to free wheel is increased, the contact area of wool felt and flywheel is reduced to enhance the inertial rotating speed of flywheel, while maintaining the expected braking efficiency, thus resulting in an excellent smooth operation.

As people are paying more attention to their health, many indoor body building device have been developed for this purpose, and among them the exerciser is very popular.

It is well known that the exerciser is derived from the principle of bicycle. Referring to FIG. 1 now, an exerciser of the prior art has the pedals 10 attached to a driving wheel 12, the driving wheel 12 can transmit motions to turn a free wheel 16 by means of a chain 14, then a catch member 20 secured in a hole 16 at the free wheel 16 can be applied to make the flywheel 30 driven in one direction.

Again, referring to FIG. 2, the catch member 20 is comprised of an outer shell 22 and an inner shell 24, wherein a plurality of bevel teeth 26 are provided around the inner periphery of the outer shell 22 at one end thereof, the inner shell 24 is secured on the shaft 32 of a flywheel 30, and a snap hook 28 is fitted to the inner shell 24 at an adequate place thereon. A spring (not shown) is built in the snap hook 28 to project the snap hook 28 out of the inner shell 24 normally. But if the spring is pressed, it will make the snap hook 28 lowered. Therefore, as soon as the driving wheel 12 transmits motions in the positive direction to the free wheel 16 through the chain 14, the free wheel will also rotate in the positive direction, then the bevel teeth 26 at the outer shell 22 of the catch member 20 will mesh with the projected snap hook 28 out of the inner shell 24 to drive the flywheel 30, otherwise the snap hook 28 will be pressed by the corresponding face of bevel teeth 26 at the outer shell 22 to prevent it from being driven by the the flywheel 30.

Though the aforesaid driving mechanism does cause any problem in operation, the clearance between two adjacent bevel teeth 26 of the outer shell 22 is likely to cause a feeling of "inoperative pedaling" when one steps on the pedals 10 instantaneously in the positive direction under the condition that the pedals 10 are at a standstill (that is, when the driving wheel 12 and the free wheel 16 are not actuated). Despite of the fact that the clearance between two adjacent bevel teeth 26 is not so wide, the resultant stroke of "inoperative pedaling" will be increased in proposition of the gear ratio of the driving wheel 12 to the free wheel 16, thereby causing the user to feel very uncomfortable. On the other hand, such a feeling of "inoperative pedaling" would also occur upon pedaling at the time when the flywheel 30 is still doing its inertial rotation.

Moreover, the driving mechanism of the prior art uses a wool felt 34 to cover the outer periphery of the flywheel 30 in order to form an adjustable friction drag upon pedaling subject to the contacting condition of the wool felt 34 with the flywheel 30. In the prior art, however, the wool felt 34 usually covers more than one half of the outer diameter of the flywheel 30, that means more than half a turn of the flywheel 30 is subject to the friction drag. Under the situation that the gear ratio of the driving wheel 12 to the free wheel 16 is 3.3:1 to 3.8:1 only, the free wheel 16 is just able to make 3.3 to 3.8 turns at each turn of the driving wheel 12 (the same also applies to the flywheel 30). Therefore, after the turns subject to the friction drag are deducted, the actual turns for inertia positive rotation are greatly reduced, thus leading to an inefficient pedaling which is the reason why one feels uncomfortable upon pedaling an exerciser of the prior art.

SUMMARY OF THE INVENTION

The present invention has been accomplished under the aforesaid circumstances. It is therefore the object of the present invention to provide an exerciser driving mechanism which can substantially eliminate the feeling of "inoperative pedaling" as experienced in the prior art.

BRIEF DESCRIPTION OF THE DRAWINGS

The present invention will be described in detail by way of example with reference to the annexed drawings, in which.

DETAILED DESCRIPTION OF THE PREFERRED EMBODIMENT

Figure 1:
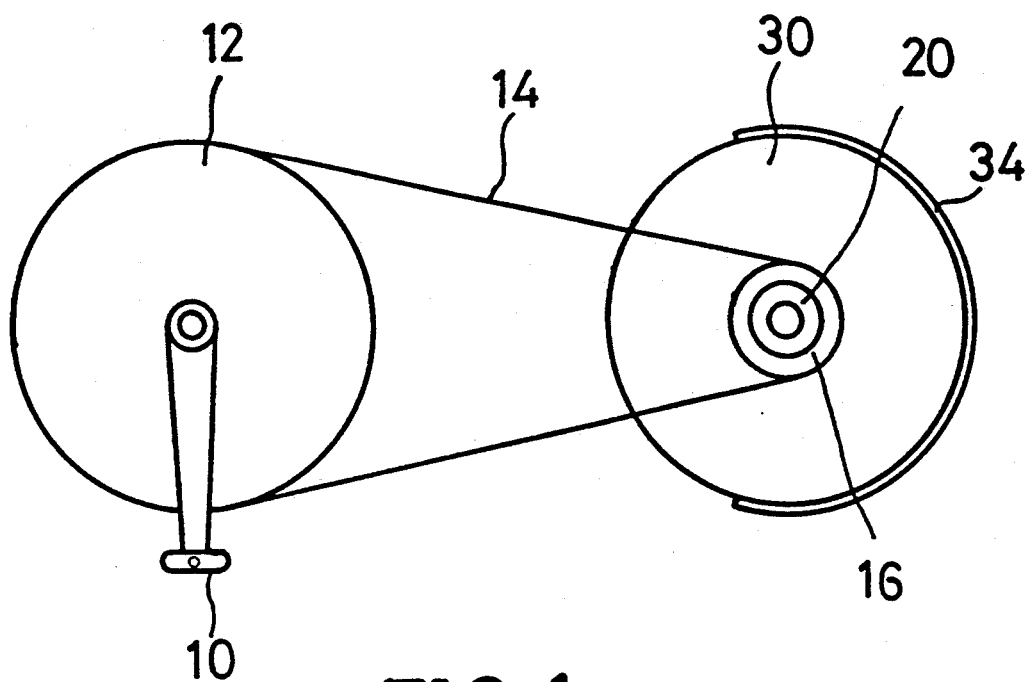
FIG. 1 is a plan view showing an exerciser driving mechanism in accordance with the prior art.
Figure 2:
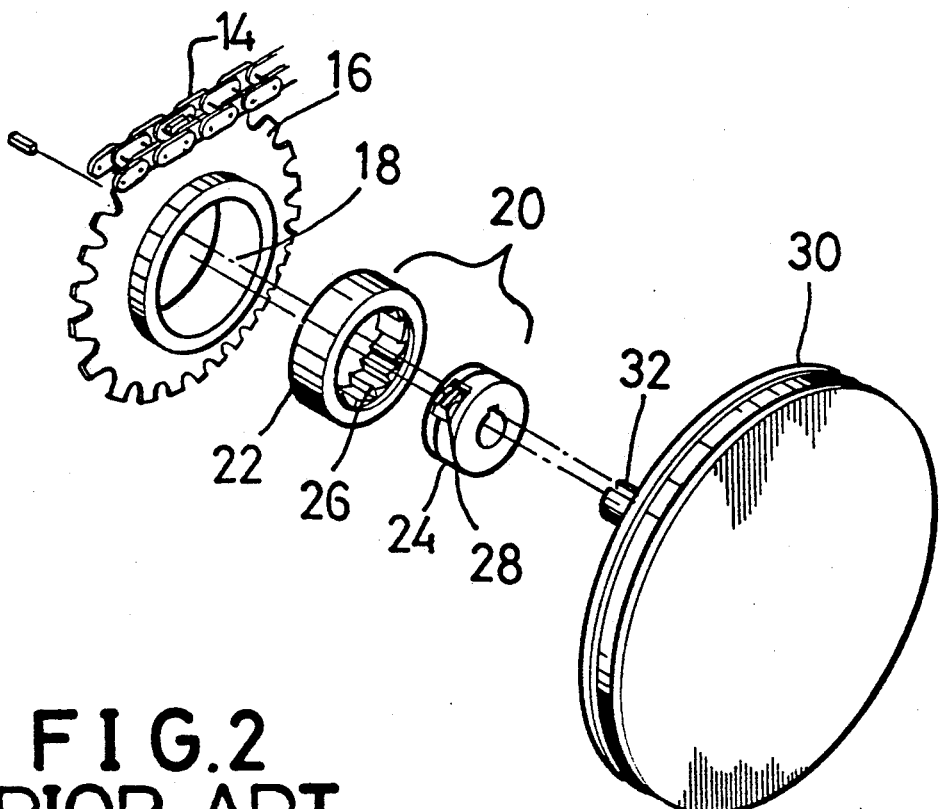
FIG. 2 is an exploded view of a catch member used by the driving mechanism of FIG. 1.
Figure 3:
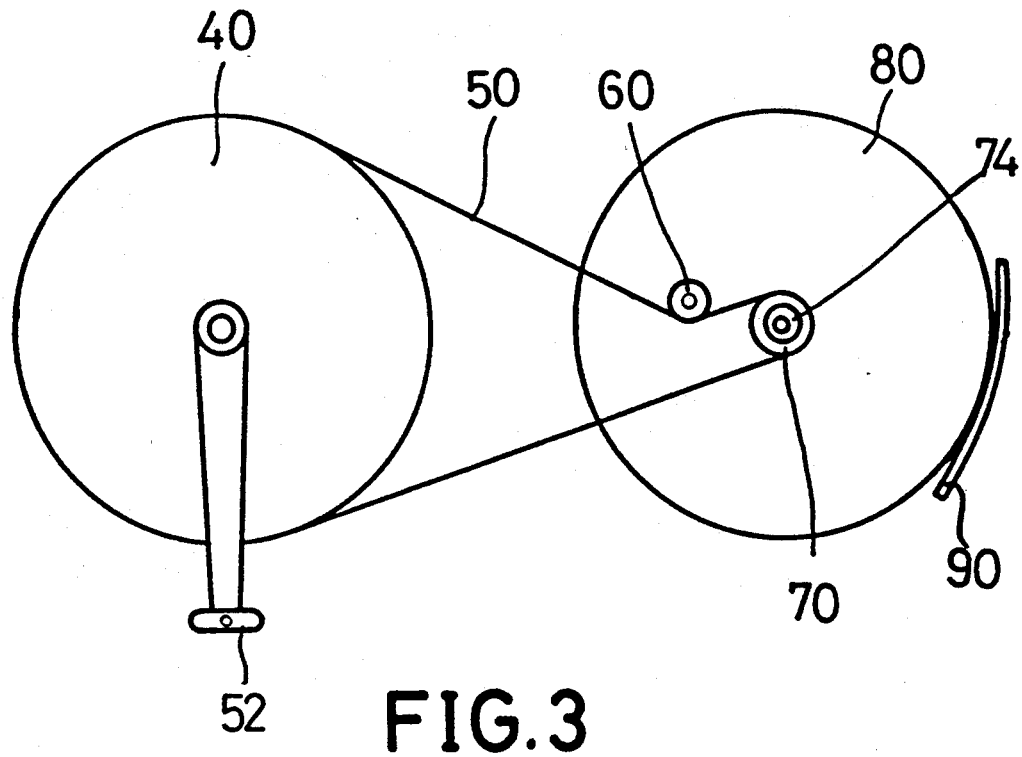
FIG. 3 is a plan view showing an exerciser driving mechanism in accordance with the present invention.
Figure 4:
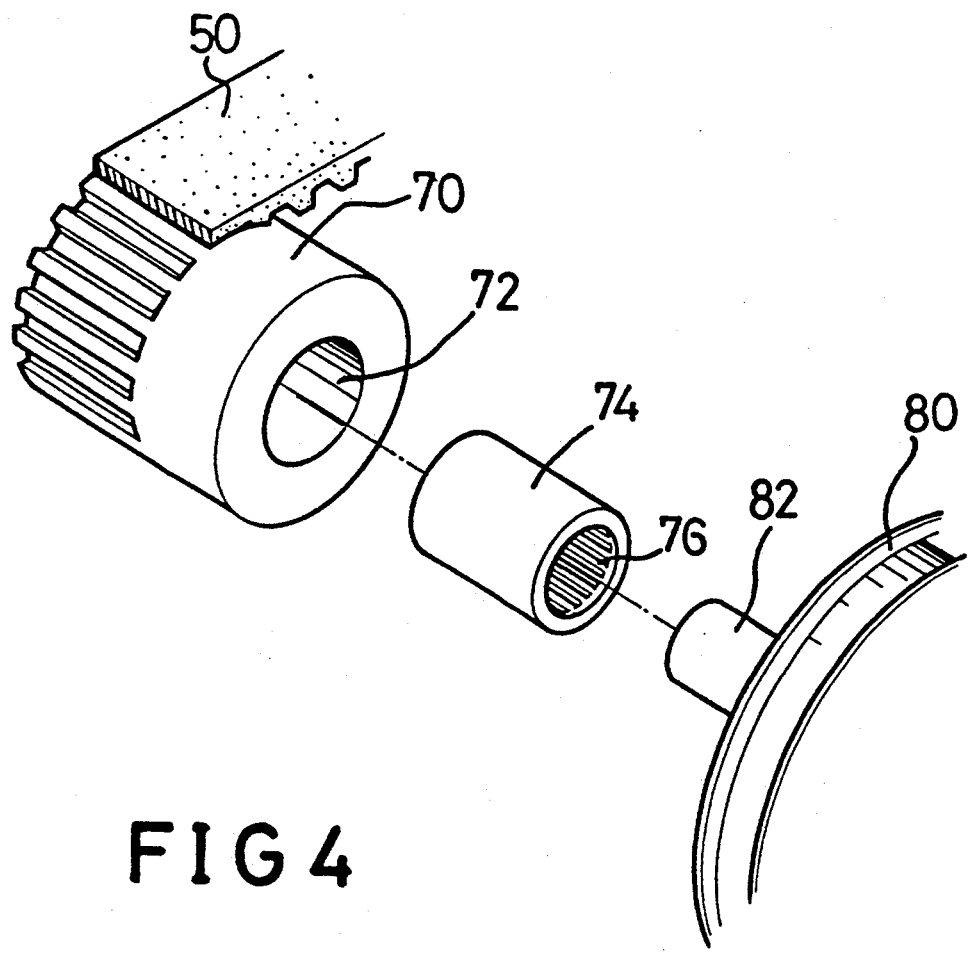
FIG. 4 is an exploded view showing part of the mechanism of the present invention.

Referring to FIGS. 3 and 4, a driving mechanism in accordance with the present invention is generally comprised of a driving wheel 40, a timing belt 50, a tension wheel 60, a free wheel 70, a flywheel 80, and a wool felt 90.

The gear ratio of driving wheel 40 to free wheel 70 is approximately 6:1 to 8:1. The driving wheel 40 transmits motions to the free wheel 70 through the timing belt 50 which can help increase the speed of inertia rotation in regard to the flywheel 80. A roller bearing 74 is secured into a hole 72 at the free wheel 70 to act as an element for driving a shaft 82 of the flywheel 80. The roller bearing 74 is designed to turn the flywheel 80 only when one is stepping on the pedals 52 in the positive direction. The tension wheel 60 is situated slightly above the free wheel 70 on one side thereof, which is used to change the tangent position of the timing belt 50, making at beast one half of the teeth of the free wheel 70 covered by the timing belt 50. Further, the wool felt 90 is located adjacent to one side of the flywheel 80, making the contact area of the wool felt 90 and the flywheel 80 to be about one eighth of the outer diameter of the flywheel 80.

Therefore, when one steps on the pedals 52 in the positive direction to rotate the driving wheel 40, one turn of the driving wheel 40 will drive the free wheel 70 to make 6-8 turns due to their gear ratio, and at each turn of the free wheel 70, the flywheel 80 will follow to turn once. In such an arrangement, a better pedaling efficiency is obtained.

No matter the pedals 52 are at a standstill or the flywheel 80 is yet under the situation of its inertial rotation, when an instantaneous pedaling is made in the positive direction, a number of rollers 72 incorporated in the roller bearing 74 around the inner hole thereof always keep close contact with a shaft 82 of the flywheel 80 to avoid the occurrence of any "inoperative pedaling". In short, each single roller 76 contacts with the shaft 82 at the end face thereof to form a braking point, and many such rollers 76 represent that many braking points will be thus formed. In this way, good and prompt braking effect is available, no problem in regard to the "clearance" shall be worried.

Further, as the free wheel 70 and the flywheel 80 in accordance with the present invention are turning much faster than those conventional ones, a timing belt 50 is applied to transmit motions for the purpose of reducing the noise which is likely caused at high speed of rotation.

Again, if the free wheel 70 is rotating very fast, its tangential centrifugal force will be increased accordingly. To deal with, a tension wheel 60 is duly provided on one side of the free wheel 70 to change the tangential position of the timing belt 50, making the timing belt 50 mesh with at least one half of the teeth of the free wheel 70 to prevent the timing belt 50 from getting disengaged.

According to the present invention, there is no worry that it will not obtain effective and enough friction drag just by the contact area of the wool felt 90 and the flywheel 80 to be about one eighth of the outer diameter of the flywheel 80. As each turn of the driving wheel 40 can drive the flywheel 80 to make 6-8 turns, that is more than two times the rotating speed of those flywheels used by conventional exercisers, so the total turns for friction drag purpose is almost equal to those conventional ones, while the total number of positive turns obtained according to the present invention are several times the prior art ones which can not compare with the present invention in terms of the feeling of smoothness one can enjoy upon pedaling.

What is claimed is:

1. An exerciser driving mechanism, comprising a driving wheel, a timing belt, a tension wheel, a flywheel, and a wool felt, characterized in that the gear ratio of said driving wheel to said free wheel is approximately 6:1 to 8:1; said driving wheel transmitting motions to said free wheel through the timing belt which can help increase the speed of inertial rotation in regard to said flywheel; a roller bearing being secured into a hole at said free wheel to act as an element for driving a shaft of said flywheel; said roller bearing being designed to turn said flywheel only when one is pedaling in the positive direction; the tension wheel being situated slightly above said free wheel on one side thereof and being used to change the tangent position of said timing belt, making at least one half of the teeth of said free wheel covered by said timing belt; and the wool felt being located adjacent to one side of said flywheel, making the contact area of said wool felt with said flywheel to be about one eighth of the outer diameter of said flywheel.

* * * * *